United States Patent
Tieleman et al.

(10) Patent No.: US 7,425,173 B2
(45) Date of Patent: Sep. 16, 2008

(54) DEVICE FOR REMOVING VISCERA FROM SLAUGHTERED POULTRY

(75) Inventors: Edward Tieleman, Dalhem (BE); Gerhard Albertus Willemsen, Drempt (NL); Koen Van Der Veen, Doesburg (NL)

(73) Assignee: Tieleman Food Equipment B.V., Doesburg (NL)

( * ) Notice: Subject to any disclaimer, the term of this patent is extended or adjusted under 35 U.S.C. 154(b) by 0 days.

(21) Appl. No.: 11/587,670

(22) PCT Filed: Apr. 28, 2005

(86) PCT No.: PCT/NL2005/000321

§ 371 (c)(1),
(2), (4) Date: Jun. 5, 2007

(87) PCT Pub. No.: WO2005/104858

PCT Pub. Date: Nov. 10, 2005

(65) Prior Publication Data

US 2008/0032615 A1 Feb. 7, 2008

(30) Foreign Application Priority Data

Apr. 28, 2004 (NL) .................................. 1026072

(51) Int. Cl.
*A22B 5/18* (2006.01)
(52) U.S. Cl. ..................................................... 452/117
(58) Field of Classification Search ................ 452/117, 452/106, 118, 123, 116
See application file for complete search history.

(56) References Cited

U.S. PATENT DOCUMENTS

| | | | | |
|---|---|---|---|---|
| 3,879,803 A | * | 4/1975 | Verbakel | 452/117 |
| 4,019,222 A | * | 4/1977 | Scheier et al. | 452/117 |
| 5,707,280 A | * | 1/1998 | Tieleman et al. | 452/117 |
| 5,713,786 A | * | 2/1998 | Kikstra | 452/118 |
| 6,027,403 A | * | 2/2000 | Hazenbroek et al. | 452/117 |
| 6,811,478 B2 | * | 11/2004 | van den Nieuwelaar et al. | 452/117 |

FOREIGN PATENT DOCUMENTS

| | | |
|---|---|---|
| BE | 400 044 | 1/1934 |
| EP | 0 497 014 | 3/1994 |
| NL | A 9100153 | 8/1992 |
| WO | WO 98/44806 | 10/1998 |
| WO | WO 01/52659 | 7/2001 |

\* cited by examiner

*Primary Examiner*—Thomas Price
(74) *Attorney, Agent, or Firm*—The Webb Law Firm

(57) ABSTRACT

A device for removing viscera from slaughtered poultry via an opening in the abdomen thereof, having a removal member that can be moved between the stomach wall and the viscera into the abdominal cavity and then towards the back, as well as a bracing member for retaining the viscera, such as the gullet, with respect to the removal member. A retaining member is provided that can be moved between the back and the viscera into the abdominal cavity, which retaining member has a retaining surface at the bottom, and the removal member has an opposing retaining surface such that the retaining surface of the retaining member and the opposing retaining surface of the removal member moved towards the back can be held in the direction in which they are pushed towards one another, clamping the viscera.

19 Claims, 5 Drawing Sheets

DEVICE FOR REMOVING VISCERA FROM SLAUGHTERED POULTRY

BACKGROUND OF THE INVENTION

1) Field of the Invention

The invention relates to a device for removing viscera from slaughtered poultry via an opening in the abdomen thereof, comprising a removal member that can be moved via the opening between the stomach wall and the viscera into the abdominal cavity and then towards the back and then out of the abdominal cavity of the poultry, as well as retaining means for retaining the viscera, such as the gullet, with respect to the removal member.

2) Description of the Related Art

A device of this type is disclosed in NL-A 9100153. In this known device the removal member consists of two brackets that can be moved towards one another and away from one another. In the position in which they are moved towards one another the brackets are able to move the viscera in the clamped state from the carcass towards the outside. In this context it is important that the viscera are completely removed, that is to say including the crop with gullet. Since these organs are fairly firmly attached to the surrounding tissue, it must be possible to exert a relatively high pulling force during this operation. If these organs are not grasped properly, or are not grasped low enough, only a portion is removed because tearing in the organs occurs.

A further disadvantage of the known device is that this is relatively vulnerable as a consequence of the turning movements that the brackets have to be able to make with respect to one another. In order to achieve these turning movements fairly complex technical measures have to be taken which merely further increase the vulnerability.

SUMMARY OF THE INVENTION

The aim of the invention is, therefore, to provide a device for the removal of viscera from slaughtered poultry via an opening in the abdomen thereof which is simpler and consequently more reliable and less vulnerable. Said aim is achieved in that a retaining member is provided that can be moved between the back and the viscera into the abdominal cavity and that has a retaining surface and in that the removal member has an opposing retaining surface such that the retaining surface of the retaining member and the opposing retaining surface of the removal member moved towards the back can be held in the direction in which they are pushed towards one another, clamping the viscera.

With the device according to the invention the removal member, which in itself consists of a single part and has no further moving parts, can be moved along the breastbone of the poultry into the abdominal cavity in a known manner. This takes place in a simple and reliable manner since only a single introduction movement is needed. Thus, no other drive means are needed than those which enable this movement of the removal member. The removal member can then be moved to the back of the poultry by this same drive, during which operation the opposing retaining surface located at the bottom thereof is brought close to the viscera thereof. Insertion of the retaining member can likewise take place in a simple manner, in particular because of the fact that during this operation there only needs to be a straight line movement in the insertion direction. If necessary or desired, a lateral movement component can also be carried out in the direction from the abdomen to the back.

Preferably the removal member has a bracing piece at one end that defines the opposing retaining surface and extends laterally towards the support member. According to a further supplementary or alternative measure the bracing piece can have a cut-out and the pressure member has a pin at the bottom that can be inserted in the cut-out, which cut-out determines an opposing retaining surface and which pin determines a clamping surface. All forms of retaining surfaces are conceivable, such as flat, conical, and the like.

Furthermore, the bracing piece can have two teeth oriented towards the support member. These teeth, which are known per se for a removal member, provide a certain scraping action when pulling the viscera upwards out of the poultry, so that certain membranes at the back of the abdominal cavity can be reliably ruptured. In this context the cut-out can be between the teeth.

The movements when clamping the viscera can proceed in various ways. According to a first possible variant, for this purpose the opposing retaining surface can be oriented in the direction for removal of the viscera. With such an embodiment of the device according to the invention the retaining forces between the retaining member and the removal member can be exerted in the direction parallel to the direction for removal of the viscera. These retaining forces can be produced by moving the retaining member parallel to the removal member such that clamping of the viscera is produced.

According to a second possible variant the opposing retaining surface is oriented parallel to the direction for removal of the viscera. With this embodiment the retaining forces between the retaining member and the removal member can be exerted in the direction transverse to the direction for removal of the viscera. For this purpose the retaining member is moved towards the removal member, such that the viscera are clamped. Incidentally, it is also conceivable to produce clamping of the viscera by a combination of these movements and retaining forces.

The invention also relates to a method for operating the device as described above for the removal of the viscera from slaughtered poultry via an opening in the abdomen thereof, comprising the following steps:

suspending the poultry, moving the removal member into the abdominal cavity of the poultry via the opening between the abdominal wall and the viscera, then moving the removal member towards the back into contact with the viscera, moving the retaining member into the abdominal cavity between the back and the viscera, clamping the viscera between the retaining surface of the retaining member and the opposing retaining surface of the removal member, jointly moving the removal member and the retaining member upwards, taking the viscera with them. The sequence of these operations can be varied if necessary.

DESCRIPTION OF THE PREFERRED EMBODIMENTS

Figure 1:
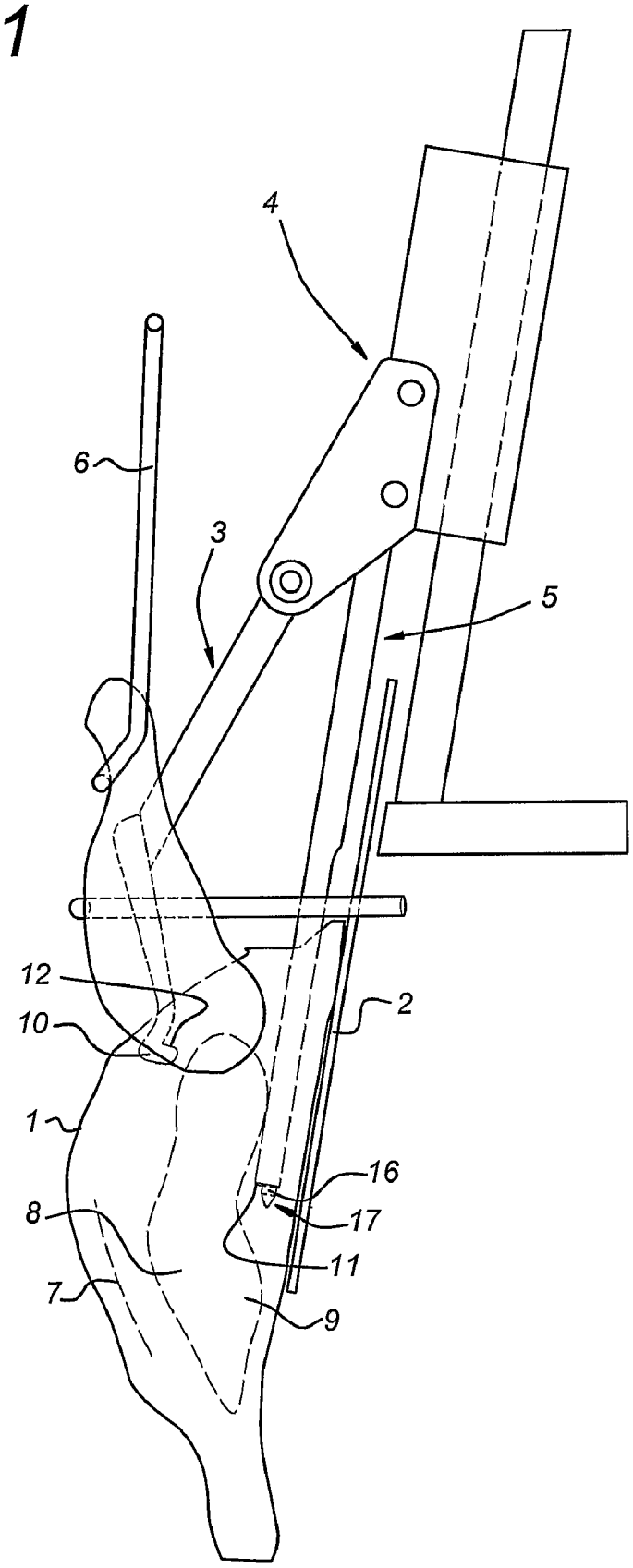
FIG. 1 illustrates the use of the device according to the present invention.
Figure 2:
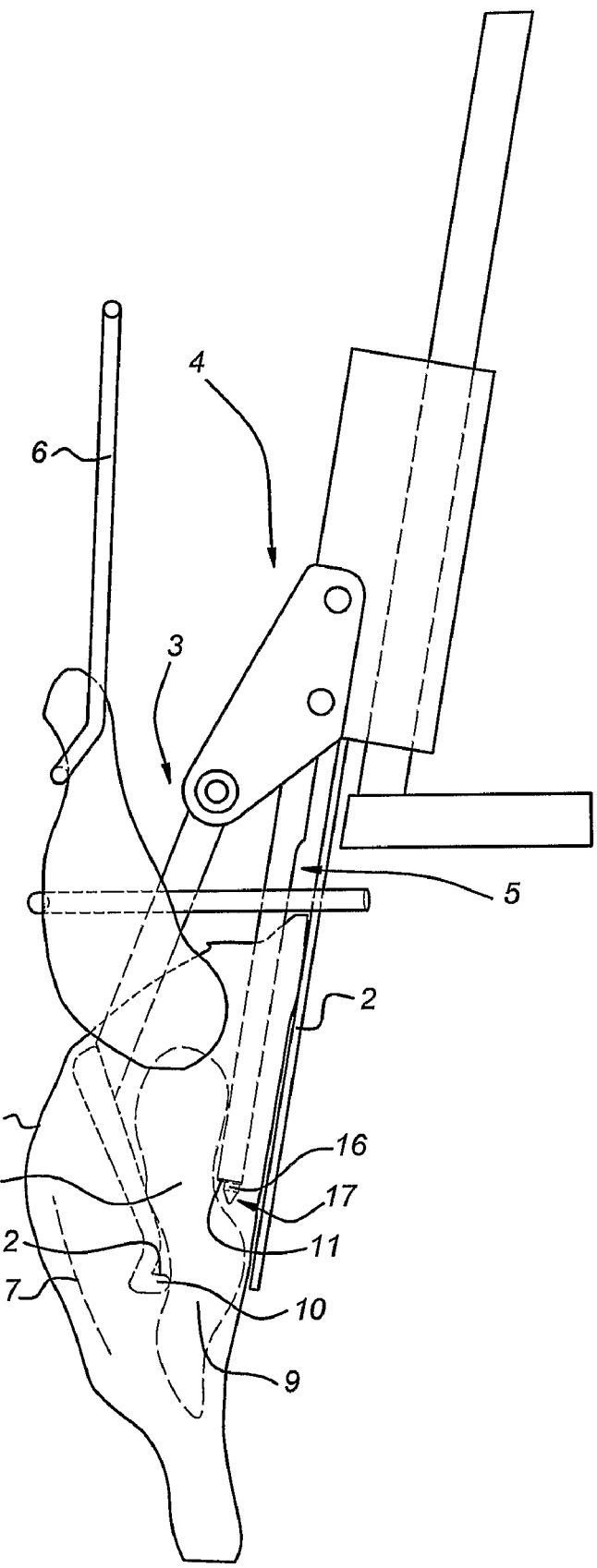
FIG. 2 further illustrates the use of the device according to the present invention.

The device shown in FIGS. 1-4 for the removal of viscera from slaughtered poultry, the contour of which is indicated diagrammatically at 1, comprises a support member 2 on which the back of the poultry bears. The device furthermore comprises a removal member 3 that is mounted on the drive device 4. The device furthermore comprises a retaining member 5, which is likewise mounted on the drive device 4. The poultry hangs by the feet from suspension means 6 known per se.

Figure 3:
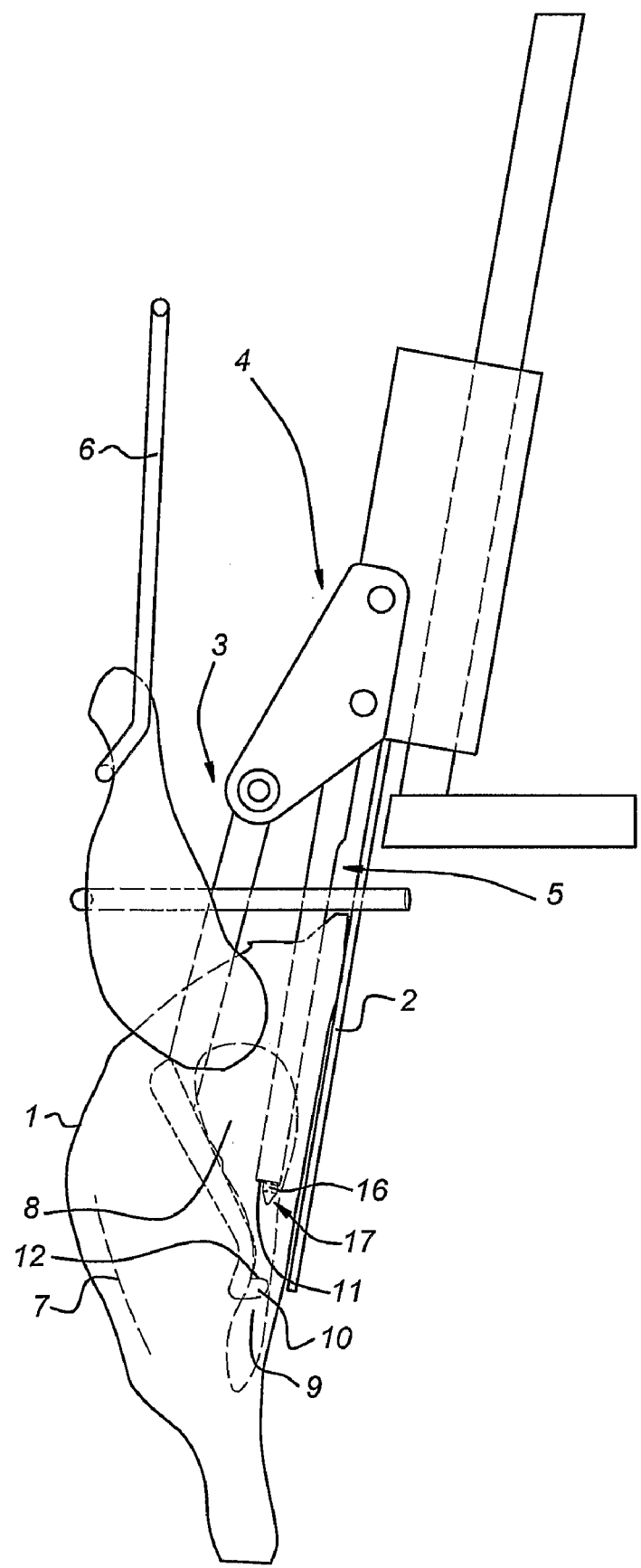
FIG. 3 further illustrates the use of the device according to the present invention.
Figure 4:
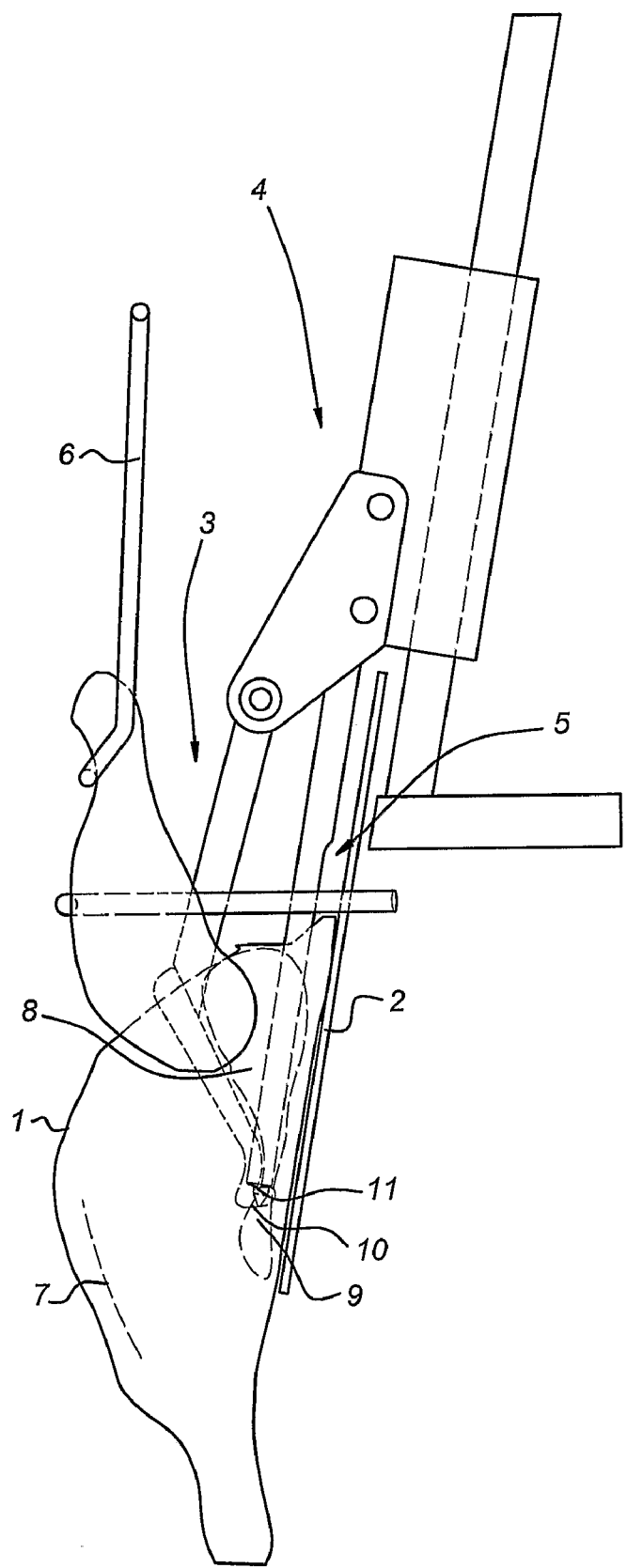
FIG. 4 further illustrates the use of the device according to the present invention.

During operation of the device according to the invention the retaining member 5 is first introduced into the abdominal cavity. The removal member 3 is then inserted between the breastbone 7 and the viscera 8: see FIG. 2. As shown in FIG. 3, the removal member 3 is thereafter moved towards the support member 2. During this operation the viscera 8, in particular the gullet 9, are seized and centred and subjected to pressure by the bracing member 10 that is at the bottom of the removal member 3.

In order to grasp the gullet 9 firmly, the retaining member 5 and the removal member 3 are moved towards one another. During this operation the gullet 9 is firmly clamped between the retaining surface 11 of the retaining member 5 facing downwards and the opposing retaining surface 12 of the bracing member 10 facing upwards.

Figure 5:
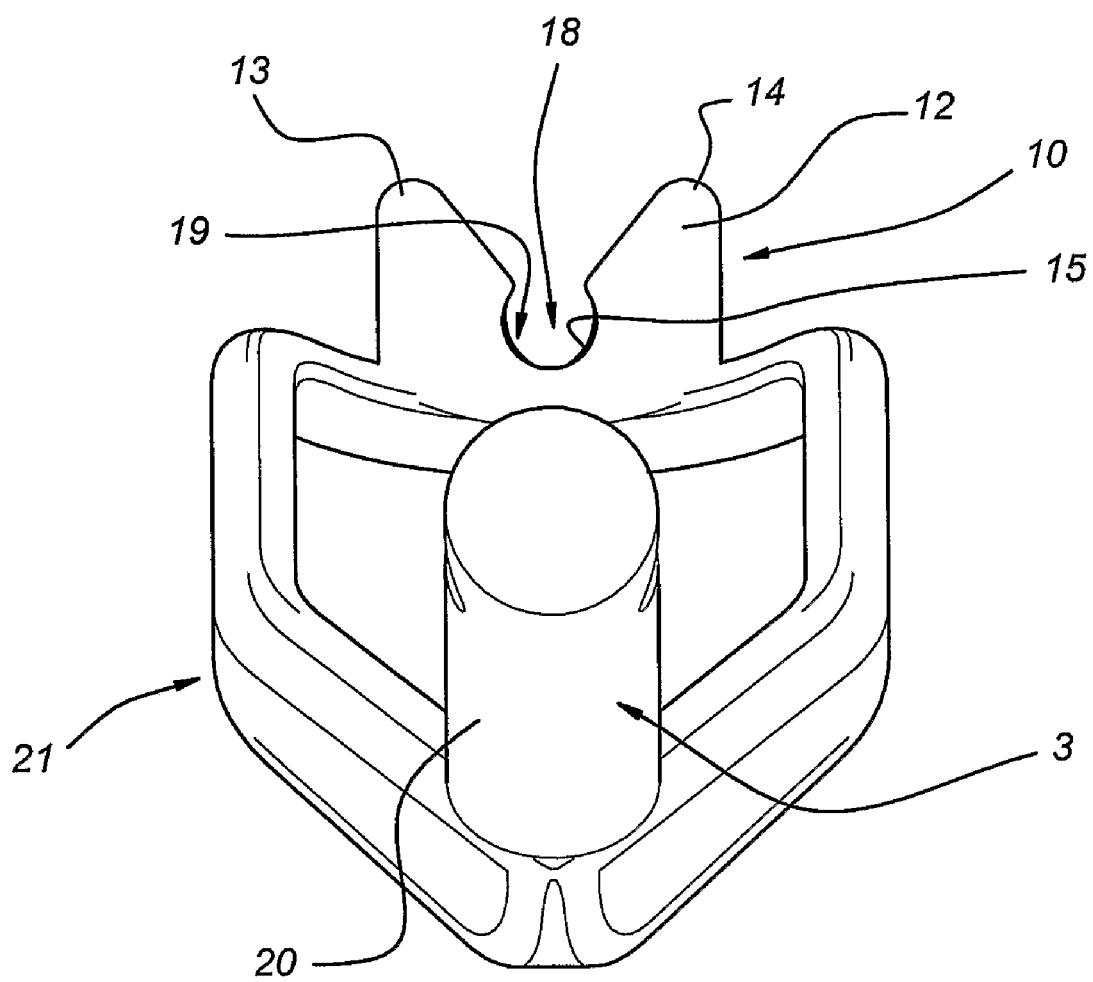
FIG. 5 is a front plan view of the bracing member of the present invention.

It can be seen from the plan view in FIG. 5 that the bracing member 10 has two teeth 13, 14, between which the cut-out 18 is located. Part of the opposing retaining surface 15 is also defined between these teeth 13, 14. This opposing retaining surface 15 interacts with the retaining surface 16 that is at the periphery of the pin 17 at the bottom of the retaining member 5. Incidentally, the abovementioned retaining surface 11 extends around this retaining member 5. The gullet 9 can therefore also be clamped between this retaining surface 16 and opposing retaining surface 15 of the pin 17 and the cut-out between the teeth 11, 14, respectively.

As soon as the gullet 9 has been clamped, the removal member 3 is moved upwards together with the retaining member 5, the gullet 9 being torn free and the viscera 8 being able to be removed from the poultry 1. During this operation the teeth 13, 14 also have the supplementary role of pulling the tissues away from the carcass by scraping.

The cut-out 18 in the bracing member 10 that opens laterally has an undercut 19 in which the pin 17 of the retaining member 5 can be accommodated such that said pin 17 is not able to emerge laterally from the cut-out 18.

The removal member 3 has a rod-shaped part 20 as well as a bow-shaped part 21 adjoining the latter, at the bottom of which part 21 the bracing member 10 is fixed. By means of the bow-shaped part 21 the viscera 8 can be supported to some extent during the removal.

Although in the embodiment described above the opposing retaining surface 12 facing upwards is moved upwards into contact with the retaining surface 11 facing downwards, an embodiment is also conceivable where the surfaces 16, 15 are moved laterally towards one another or in accordance with a combined downward/lateral movement.

The invention claimed is:

1. A device for removing viscera from slaughtered poultry via an opening in the abdomen thereof, comprising a removal member that can be moved between the stomach wall and the viscera into the abdominal cavity and then towards the back and then out of the abdominal cavity of the poultry, as well as retaining means for retaining the viscera with respect to the removal member, wherein a retaining member is adapted to move between the back and the viscera into the abdominal cavity, and the retaining member has a retaining surface and, wherein the removal member has an opposing retaining surface such that the retaining surface of the retaining member and the opposing retaining surface of the removal member, once the removal member is moved towards the back of the poultry, can be held in the direction in which they are pushed towards one another, clamping the viscera.

2. The device according to claim 1, wherein the removal member has a bracing piece at one end that defines the opposing retaining surface and extends laterally towards a support member.

3. The device according to claim 2, wherein the opposing retaining surface faces in a direction for removal of the viscera.

4. The device according to claim 2, wherein the bracing piece has a cut-out and the retaining member has a pin at the bottom that can be inserted in the cut-out, wherein the cut-out determines an opposing retaining surface and wherein the pin determines a retaining surface.

5. The device according to claim 4, wherein the cut-out in the bracing piece opens laterally.

6. The device according to claim 5, wherein the cut-out defines an undercut, whereby the pin can be blocked in the undercut to prevent lateral movement.

7. The device according to claim 6, wherein the bracing piece has two teeth oriented towards the support member.

8. The device according to claim 5, wherein the bracing piece has two teeth oriented towards the support member.

9. The device according to claim 4, wherein the bracing piece has two teeth oriented towards the support member.

10. The device according to claim 2, wherein the bracing piece has two teeth oriented towards the support member.

11. The device according to claim 2, wherein the opposing retaining surface faces parallel to a direction for removal of the viscera.

12. The device according to claim 10, wherein the cut-out is located between the teeth.

13. The device according to claim 1, wherein the retaining member is mounted such that it can be moved in the longitudinal direction thereof.

14. The device according to claim 1, wherein the retaining member is mounted such that it can move in a transverse direction thereof.

15. The device according to claim 1, wherein the retaining member is mounted such that it can move in a straight line.

16. A method for operating the device according to claim 1 for the removal of the viscera from slaughtered poultry via an opening in the abdomen thereof, comprising the following steps:

a) suspending the poultry, b) moving the removal member into the abdominal cavity of the poultry via the opening between the abdominal wall and the viscera, c) then moving the removal member towards the back into contact with the viscera, d) moving the retaining member into the abdominal cavity between the back and the viscera, e) clamping the viscera between the retaining surface of the retaining member and the opposing retaining surface of the removal member, and f) jointly moving the removal member and the retaining member back, taking the viscera with them.

17. The method according to claim 16, comprising exerting retaining forces between the retaining member and the removal member in the direction parallel to the direction for removal of the viscera.

18. The method according to claim 17, comprising exerting retaining forces between the retaining member and the removal member in the direction transverse to the direction for removal of the viscera.

19. The method according to claim 16, comprising exerting retaining forces between the retaining member and the removal member in the direction transverse to the direction for removal of the viscera.

* * * * *